United States Patent
MacLeod

(10) Patent No.: US 9,615,144 B2
(45) Date of Patent: Apr. 4, 2017

(54) METHODS AND SYSTEMS FOR HANDLING ADVERTISEMENTS DURING A TRICK PLAY MODE

(71) Applicant: Eldon Technology Limited, Keighley (GB)

(72) Inventor: Scott MacLeod, Keighley (GB)

(73) Assignee: ECHOSTAR UK HOLDINGS LIMITED, Steeton (GB)

(*) Notice: Subject to any disclaimer, the term of this patent is extended or adjusted under 35 U.S.C. 154(b) by 0 days.

(21) Appl. No.: 14/248,808

(22) Filed: Apr. 9, 2014

(65) Prior Publication Data
US 2015/0296275 A1    Oct. 15, 2015

(51) Int. Cl.
| | |
|---|---|
| H04N 21/845 | (2011.01) |
| H04N 21/234 | (2011.01) |
| H04N 21/2343 | (2011.01) |
| H04N 21/235 | (2011.01) |
| H04N 21/2387 | (2011.01) |
| H04N 21/438 | (2011.01) |
| H04N 21/435 | (2011.01) |
| H04N 21/472 | (2011.01) |
| H04N 21/81 | (2011.01) |
| G11B 27/00 | (2006.01) |
| G11B 27/034 | (2006.01) |

(Continued)

(52) U.S. Cl.
CPC ....... *H04N 21/8455* (2013.01); *G11B 27/005* (2013.01); *G11B 27/034* (2013.01); *G11B 27/10* (2013.01); *H04N 21/2355* (2013.01); *H04N 21/2387* (2013.01); *H04N 21/23418* (2013.01); *H04N 21/234345* (2013.01); *H04N 21/4147* (2013.01); *H04N 21/4355* (2013.01); *H04N 21/4382* (2013.01); *H04N 21/47217* (2013.01); *H04N 21/812* (2013.01); *H04N 21/8146* (2013.01); *H04N 21/8458* (2013.01)

(58) Field of Classification Search
CPC ........... H04N 21/23424; H04N 21/458; H04N 21/812
USPC .................................................... 725/32–36
See application file for complete search history.

(56) References Cited

U.S. PATENT DOCUMENTS

| | | | |
|---|---|---|---|
| 7,779,438 B2 | 8/2010 | Davies | |
| 8,763,028 B2 | 6/2014 | Keys | |
| 2002/0144262 A1* | 10/2002 | Plotnick et al. | ................ 725/32 |

(Continued)

OTHER PUBLICATIONS

International Search Report and Written Opinion for PCT/EP2015/057770 mailed Jun. 11, 2015, 11 pages.

*Primary Examiner* — Nicholas Corbo
(74) *Attorney, Agent, or Firm* — Kilpatrick Townsend & Stockton LLP

(57) ABSTRACT

Various arrangements for handling broadcast of advertiser content are presented. A plurality of frames of an advertisement may be analyzed for an advertiser-specific graphical identifier. A frame of the plurality of frames may be selected based on the advertiser-specific graphical identifier being present. The broadcast content may be encoded into a format for transmission to a plurality of television receivers. Encoding may include defining the frame selected from the plurality of frames such that the frame can be decoded independently of other frames of the plurality of frames. A subset of the plurality of frames may require decoding of the selected frame to be performed prior to decoding of any individual frame of the subset of frames.

15 Claims, 8 Drawing Sheets

(51) Int. Cl.
*G11B 27/10* (2006.01)
*H04N 21/4147* (2011.01)

(56) References Cited

U.S. PATENT DOCUMENTS

| | | | |
|---|---|---|---|
| 2003/0152363 A1 | 8/2003 | Jeannin et al. | |
| 2008/0155585 A1* | 6/2008 | Craner et al. | 725/32 |
| 2009/0265737 A1* | 10/2009 | Issa | G06F 17/30817 725/38 |
| 2014/0023348 A1* | 1/2014 | O'Kelly | G11B 27/031 386/278 |
| 2014/0082648 A1* | 3/2014 | Tanner | G06Q 20/145 725/14 |

* cited by examiner

METHODS AND SYSTEMS FOR HANDLING ADVERTISEMENTS DURING A TRICK PLAY MODE

BACKGROUND

Frequently, rather than viewing broadcast television content live, a television viewer will record the television program and view it at a later time using a digital video recorder (DVR). In addition to being able to watch the television programming at the viewer's convenience, the television viewer may fast forward through commercials. While the television viewer may see this as a benefit of recording the television content, advertisers that have purchased advertising time during the television program likely do not. A television service provider may have the ability to block fast forwarding of commercials, but such a block may annoy customers and negatively impact the user experience.

SUMMARY

In some embodiments, a method for handling broadcast of advertiser content is presented. The method may include receiving, by a television service provider computer system, broadcast content from a content provider, wherein the broadcast content comprises a video-based advertisement. The method may include analyzing a plurality of frames of the advertisement present in the broadcast content for an advertiser-specific graphical identifier. The method may include selecting a frame of the plurality of frames based on the advertiser-specific graphical identifier being present. The method may include encoding the broadcast content into a format for transmission to a plurality of television receivers. Such encoding may include encoding the frame selected from the plurality of frames such that the frame can be decoded independently of other frames of the plurality of frames. For presentation, a subset of the plurality of frames may require decoding of the selected frame to be performed prior to decoding of any individual frame of the subset of frames.

Embodiments of such a method may include one or more of the following features: The method may include receiving, by a television receiver, the encoded broadcast content. The method may include decoding, by the television receiver, the encoded broadcast content. The method may include commencing output, by the television receiver, for presentation, the decoded broadcast content. The method may include receiving, by the television receiver, user input specifying playback of the decoded broadcast content should be performed in a trick mode. The method may include switching, by the television receiver, output of the decoded broadcast content to the trick mode. The method may include, while in the trick mode, output for presentation, by the television receiver, the selected frame. The method may include, while in the trick mode, skipping, by the television receiver, output for presentation of the subset of the plurality of frames. Encoding the broadcast content into the format for transmission to the plurality of television receivers may include encoding the broadcast content into MPEG encoding, wherein the selected frame is encoded as an I-frame and the subset of frames is encoded as P-frames, B-frames, or some combination thereof. The method may include outputting, by a television receiver, while in a trick play mode, only I-frames. The advertiser-specific graphical identifier being present may include a graphical indication selected from the group consisting of: a graphical logo of the advertiser; and text identifying the advertiser. Selecting the frame of the plurality of frames based on the advertiser-specific graphical identifier being present may be based on an advertiser frame identification received from the content provider. The method may include broadcasting, by the television service provider, the encoded broadcast content to a plurality of television receivers, wherein the broadcast content includes a television program.

In some embodiments, a system for handling broadcast of advertiser content is presented. The system may include an encoding management engine, which may include one or more processors and a memory communicatively coupled with and readable by the one or more processors and having stored therein processor-readable instructions. When executed by the one or more processors, the instructions may cause the one or more processors to receive broadcast content from a content provider, wherein the broadcast content comprises a video-based advertisement. The instructions may cause the one or more processors to analyze a plurality of frames of the advertisement present in the broadcast content for an advertiser-specific graphical identifier. The instructions may cause the one or more processors to select a frame of the plurality of frames based on the advertiser-specific graphical identifier being present. The instructions may cause the one or more processors to encode the broadcast content into a format for transmission to a plurality of television receivers. Such encoding may include encoding the frame selected from the plurality of frames such that the frame can be decoded independently of other frames of the plurality of frames. For presentation, a subset of the plurality of frames may require decoding of the selected frame to be performed prior to decoding of any individual frame of the subset of frames.

Embodiments of such a system may include one or more of the following features: The system may include a television receiver, configured to: receive the encoded broadcast content; decode the encoded broadcast content; and output, for presentation, the decoded broadcast content. The television receiver may be configured to receive user input specifying playback of the decoded broadcast content should be performed in a trick mode. The television receiver may be configured to switch output of the decoded broadcast content to the trick mode. The television receiver may be configured to, while in the trick mode, output for presentation the selected frame. The television receiver may be configured to, while in the trick mode, skip output for presentation of the subset of the plurality of frames. The processor-readable instructions that, when executed, cause the one or more processors to encode the broadcast content into the format for transmission to the plurality of television receivers may include processor-readable instructions which, when executed, cause the one or more processors to encode the broadcast content into MPEG encoding, wherein the selected frame is encoded as an I-frame and the subset of frames is encoded as P-frames, B-frames, or some combination thereof. The advertiser-specific graphical identifier being present may include a graphical indication selected from the group consisting of: a graphical logo of the advertiser; and text identifying the advertiser. The processor-readable instructions that, when executed, cause the one or more processors to select the frame of the plurality of frames based on the advertiser-specific graphical identifier being present may be based on an advertiser frame identification received from the content provider. The instructions may cause the one or more processors to cause the encoded broadcast content to be broadcast to a plurality of television receivers, wherein the broadcast content includes a television program.

In some embodiments, a non-transitory processor-readable medium for handling broadcast of advertiser content is presented. The instructions may be configured to cause one or more processors to receive broadcast content from a content provider, wherein the broadcast content comprises a video-based advertisement. The instructions may cause the one or more processors to analyze a plurality of frames of the advertisement present in the broadcast content for an advertiser-specific graphical identifier. The instructions may cause the one or more processors to select a frame of the plurality of frames based on the advertiser-specific graphical identifier being present. The instructions may cause the one or more processors to encode the broadcast content into a format for transmission to a plurality of television receivers. Such encoding may include encoding the frame selected from the plurality of frames such that the frame can be decoded independently of other frames of the plurality of frames. For presentation, a subset of the plurality of frames may need decoding of the selected frame to be performed prior to decoding of any individual frame of the subset of frames.

Embodiments of such a non-transitory computer-readable medium may include one or more of the following features: The processor-readable instructions configured to cause the one or more processors to encode the broadcast content into the format for transmission to the plurality of television receivers may include processor-readable instructions configured to cause the one or more processors to encode the broadcast content into MPEG encoding, wherein the selected frame is encoded as an I-frame and the subset of frames is encoded as P-frames, B-frames, or some combination thereof. The advertiser-specific graphical identifier being present comprises a graphical indication selected from the group consisting of a graphical logo of the advertiser; and text identifying the advertiser. The processor-readable instructions configured to cause the one or more processors to select the frame of the plurality of frames based on the advertiser-specific graphical identifier being present may be based on an advertiser frame identification received from the content provider. The instructions may cause the one or more processors to cause the encoded broadcast content to be broadcast to a plurality of television receivers, wherein the broadcast content includes a television program.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
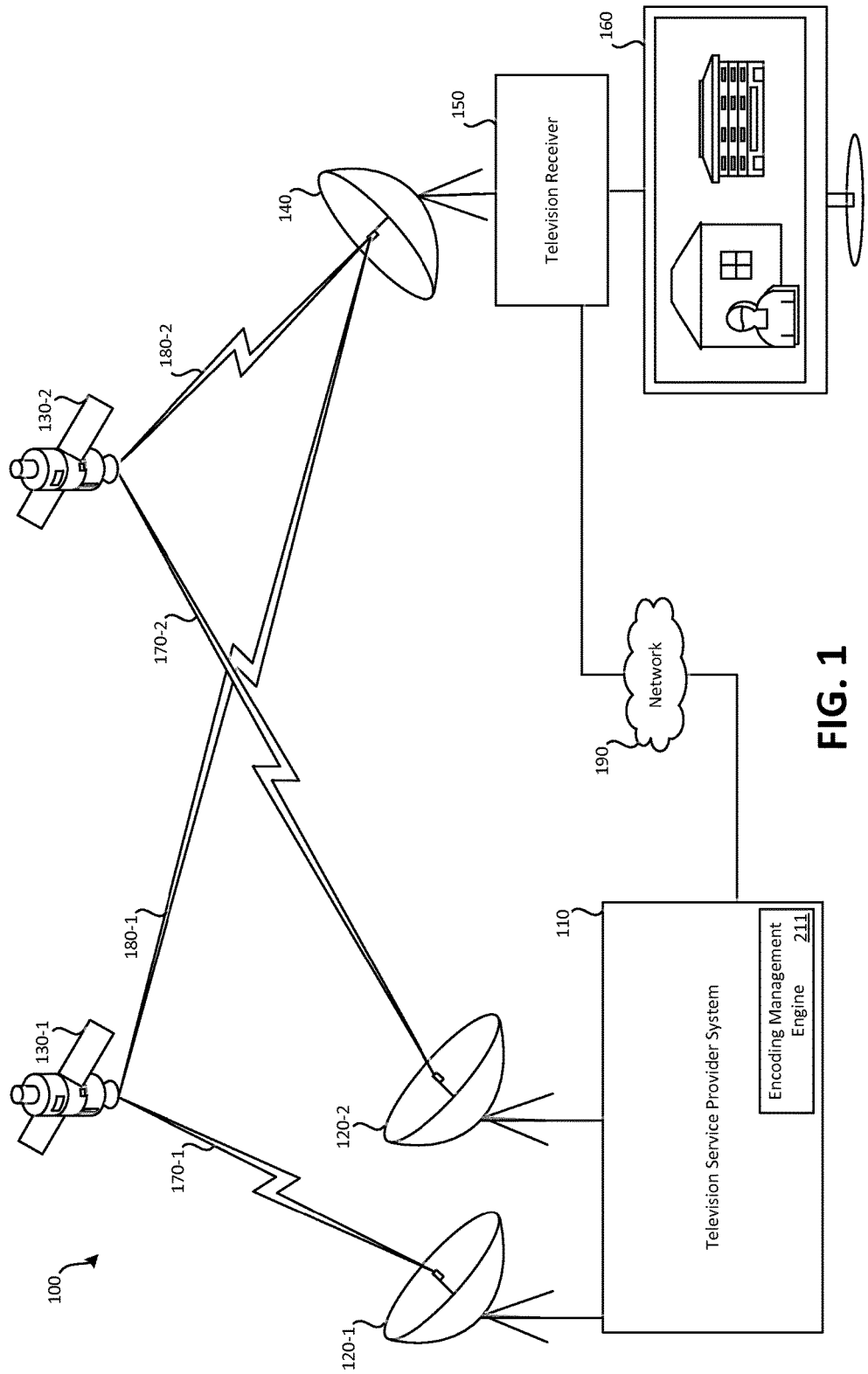
FIG. 1 illustrates an embodiment of a television distribution system configured to manage encoding and distribution of content.

A television viewer may record television programming using a dedicated digital video recorder (DVR) or a device having DVR capabilities. To record such television programming, the user or a television service provider may define a timer that causes the DVR to record a particular television channel for a period of time. In addition to recording the desired television program, the timer may result in television commercials being recorded that appear before, during, and/or after the television program.

During playback of recorded television programming (also referred to as recorded content), the viewer may desire to skip the commercials. To do so, the television viewer may provide input to the DVR that causes the device to enter a "trick play" mode. A trick play mode on a DVR can, in many ways, be equated to fast forward (and also fast rewind) of an analog device, such as a VCR. In a trick play mode, rather than every frame being output for presentation, fewer frames may be output for presentation. Since fewer frames are output for presentation and other frames are skipped, playback advances through the stored content at an expedited rate. For example, in a forward trick play mode, one minute of recorded content may be viewed in ten seconds. Various "speeds" of trick play modes may be available to a viewer via the DVR.

While in the trick play mode, some frames are output for presentation while others are skipped. Such output of frames allows the viewer to see whether a commercial break has completed and if the viewer's desired content is now being presented. Accordingly, a user may tend to watch such video content output for presentation during the trick play mode carefully. Which frames are output for presentation during the trick play mode may not be random. Rather, in various encoding formats, such as MPEG-4 encoding (Moving Picture Experts Group), multiple types of frames are present. Some frames, referred to as I-frames, contain more data than other types of frames. Such I-frames can be decoded independently of other frames. Therefore, only data for a particular I-frame is needed to decode and output for presentation of the I-frame. For other types of frames, such as P-frames and B-frames, information from one or more other frames is required. For example, to decode a P-frame, a previous I-frame may also need to be decoded. While such encoding may save bandwidth, it can require additional processing to decode, since decoding of some frames is contingent on the decoding of other frames.

Using MPEG-4 as an example, when playback is being performed in a trick mode such that at least some frames are output for presentation, at least some I-frames may be required to be decoded. A limited number of other types of frames or no other types of frames may be decoded. The higher the "speed" (the more frames skipped) during playback in the trick mode, the more likely it may be that each frame output for presentation is an I-frame and the less likely frames output for presentation are other than an I-frame. Therefore, when content is being output for presentation in a trick mode, it is more likely that the output frame output for presentation is an I-frame.

Despite being output in a trick mode, if an advertiser is having its content fast forwarded through, the advertiser may still desire to have its logo, slogan, name, or other relevant information put in front of the viewer. In order to get the advertiser's desired content in front of the viewer, the advertising content can be placed in an I-frame to increase the likelihood that the frame will be output for presentation during the trick mode.

When the content is encoded for broadcast, it may be possible to manipulate the encoding process to select specific frames to be used as I-frames. During a commercial, one or more specific frames may be selected as I-frames. The specific one or more frames that are selected may be frames that have the advertiser's logo, slogan, name, or other relevant information prominently featured. The selected frames may be performed by an agent of the television service provider, by the content provider (e.g., the advertiser selecting the frame or frames that the advertiser desires to use), or in an automated arrangement in which a computer system selects one or more appropriate frames within the commercial based on the advertiser.

The designation of frames being used as I-frames is maintained through the broadcast and decoding process. Therefore, when a viewer enters a trick play mode, the I-frames containing the advertiser's logo, slogan, name, or other relevant information will likely be presented on the viewer's display device.

FIG. 1 illustrates an embodiment of a satellite television distribution system 100 configured to manage encoding and distribution of content. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 are illustrated, it should be understood that multiple (e.g., tens, thousands, millions) instances of user equipment may receive television signals from television service provider system 110 via satellites 130. While FIG. 1 focuses on satellite-based distribution of television broadcasts, it should be understood that embodiments detailed in relation to FIGS. 2-8 can be implemented in other forms of television distribution systems that distribute television programming, such as cable-based distribution systems, over-the-air (OTA) distribution systems, and IP-based distribution systems, to name several examples.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Such streams may be encoded to save bandwidth. For example, MPEG encoding may be used to decrease the amount of bandwidth required to broadcast content. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Each of these television channels may be encoded. Accordingly, if many television channels are to be made available for viewing and recording, multiple transponder streams may be necessary to transmit all of the television channels to television receiver 150.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. For example, television receiver 150 may decode signals from an encoded format such as MPEG 1, 2, 3, 4, or some other version of MPEG encoding. A television receiver is defined to include STBs and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. The television receivers detailed herein can be considered a form of DVR because such television receivers may have DVR functionality. Accordingly, embodiments detailed herein that explicitly refer to a DVR or device with DVR functionality can refer to a television receiver, which may be in the form of an STB.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels.

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams via two tuners. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190 (for reasons such as because television receiver 150 is not configured to connect to network 190 or a subscriber does not desire or cannot connect to network 190). As such, the connection between network 190 and television receiver 150 is represented by a dotted line. Via such a secondary communication channel, bidirectional exchange of data may occur. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

Television service provider system 110 may include encoding management engine (EME) 211. EME 211 may serve to encode content received from content providers into a format appropriate for broadcast to multiple television receivers, such as television receiver 150. EME 211 may receive content that is encoded in a first format, decode such content, and re-encode content into a format appropriate for distribution to television receivers. In some embodiments, initial decoding may not be required. EME 211 may encode content into MPEG-4 or some other compressed media format. Content providers that may provide content to television service provider system 110 may include television channel providers (e.g., NBC, ABC, FOX, FX, CNN, etc.) and/or advertisers that have a commercial appearing on such television channels. The television service provider operating television service provider system 110 may also produce such content that is encoded by EME 211. The encoding performed by EME 211 may be preserved through transmission. Therefore, television programming encoding performed by EME 211 may substantially represent the form in which such television programming is received by television receiver 150. Following EME 211 encoding content for transmission, such content may be scrambled and/or encrypted. Such scrambling and/or encryption may not affect the encoding performed by EME 211 once the scrambled or encrypted data is descrambled and/or decrypted.

Figure 2:
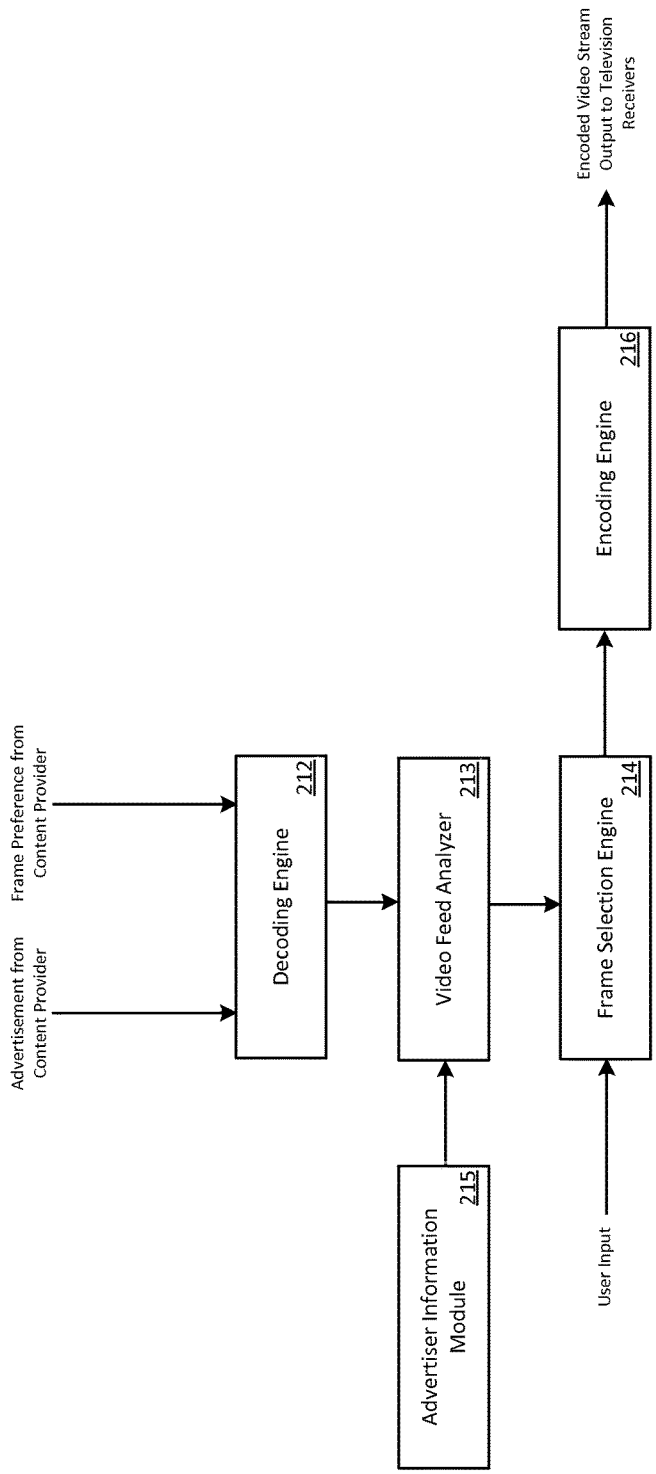
FIG. 2 illustrates an embodiment of a television service provider system configured to manage the encoding of content.

FIG. 2 illustrates an embodiment of encoding management engine 200 configured to manage the encoding of content. EME 200 may represent EME 211 of FIG. 1. Therefore, EME 200 may be incorporated as part of television service provider system 110. EME 200 may serve to decode, analyze, and re-encode content received from a content provider. In EME 200, various components are present. It should be understood that these components may be combined into fewer components or divided into a greater number of components. Further, each of these components may be implemented using software, hardware, firmware, or some combination thereof. For instance, computer system 800 of FIG. 8 may be used to implement one or more of the components of EME 200.

Decoding engine 212 may serve to receive an advertisement from a content provider. The advertisement may be encoded in a particular format from which it needs to be decoded. For instance, the advertisement may have been encoded to be transmitted to the television service provider from the content provider. If necessary, decoding engine 212 decodes the advertisement. If already encoded in an acceptable format for analysis, the decoding may be unnecessary. The decoded advertisement may be passed to video feed analyzer 213.

Video feed analyzer 213 may be configured to analyze the advertisement on a frame-by-frame basis. Video feed analyzer 213 may work in multiple ways. In some embodiments, video feed analyzer 213 may analyze individual frames of the advertisement to determine one or more frames that are preferable to present to a viewer when playback is occurring in a trick mode. For such embodiments, video feed analyzer 213 may search the frames of the advertisement for frames that present the advertiser's logo, slogan, name, and/or other information particularly relevant to the advertiser. It can be expected that video feed analyzer 213 reviews frames for video content rather than audio content. When content is output for presentation in a trick play mode, audio is not commonly output. To identify information particularly relevant to the advertiser, video feed analyzer 213 may have access to a library of information for the advertiser, such as advertiser information module 215. For instance, video feed analyzer 213 may have access to an image of the advertiser's logo, name, and slogan from advertiser information module 215. By comparing this stored information with frames of the advertisement, frames that best identify the advertiser may be identified. The contents of advertiser information module 215 may be supplied by the advertiser or may be gathered by the television service provider from public sources, such as the Internet.

In some embodiments, the content provider who provided the advertisement may select one or more frames that are deemed particularly relevant to the advertisement. Therefore, when the advertisement is provided by the content provided to decoding engine 212, one or more frame preferences may also be provided. Such a frame preference may identify the frame, such as by number, that the advertiser desires to have presented to television viewers when playback is occurring in a trick mode.

In other embodiments, an agent of the television service provider may review frames of the commercial to select one or more frames that the agent believes to accurately represent the commercial and the advertiser. Again here, the one or more frames selected by the agent may be based upon the advertiser's logo, name, slogan, and/or any other relevant advertising information of the advertiser being prominently presented. Considering that an advertisement is intended to inform viewers about the advertiser, it can be expected that at least some of the frames of the advertisement will prominently feature the name of the advertiser, the logo or the advertiser, the slogan of the advertiser, and/or other information that the advertiser desires to be presented (e.g., a sale the advertiser is currently offering, a new store opening, etc.)

Frame selection engine 214 may select one or more frames from among the analyzed frames. The frame or frames selected by frame selection engine 214 may then be encoded differently from at least some frames that were not selected. For instance, referring to MPEG encoding, selected frames may be encoded as I-frames. Generally, such as for formats other than MPEG, the selected frames may be encoded such that decoding can occur without reference to any other frame. Frame selection engine 214, in addition to selecting the frame based on the analysis of video feed analyzer 213, may also select frames based on the number of frames since a previous I-frame, the desired compression rate, and/or the amount of change occurring between frames in the advertisement. If video feed analyzer 213 reviewed individual frames for advertiser information from advertiser information module 215, frame selection engine 214 may select one or more of the analyzed frames that most prominently feature the advertiser's name, logo, slogan, current promotion, and/or other information relevant to the advertiser according to one or more predefined rules.

Encoding engine 216 may serve to encode the advertisement into a format appropriate for broadcast to one or more television receivers (or DVRs). Encoding engine 216 may encode the selected frames identified by frame selection engine 214 such that they can be independently decoded of other frames. Referring to MPEG encoding, the selected frames may be encoded as I-frames, thus increasing the chance that during a trick play mode these frames would be output for presentation to a display device being viewed by a viewer. Some or all of the frames that are not selected by frame selection engine 214 may be encoded such that they cannot be decoded without reference to another frame. Referring to MPEG encoding, such unselected frames may be encoded as P-frames or B-frames. For other reasons, such as bandwidth considerations, some of such unselected frames may be encoded as I-frames. Following such encoding, it may be more likely that frames that were unselected by frame selection engine 214 may not be presented during trick play mode playback.

The output of encoding engine 216 may be scrambled and then be transmitted to one or more television receivers (along with television programming). The advertisement processed by EME 200 may, during a broadcast, appear before, during, or after a television program. When viewed at normal playback speed, to a television viewer, the designation of selected frames as I-frames may be invisible. However, when viewed in a trick play mode, such selected frames are more likely to be output for presentation, while other frames may be skipped.

Figure 3:
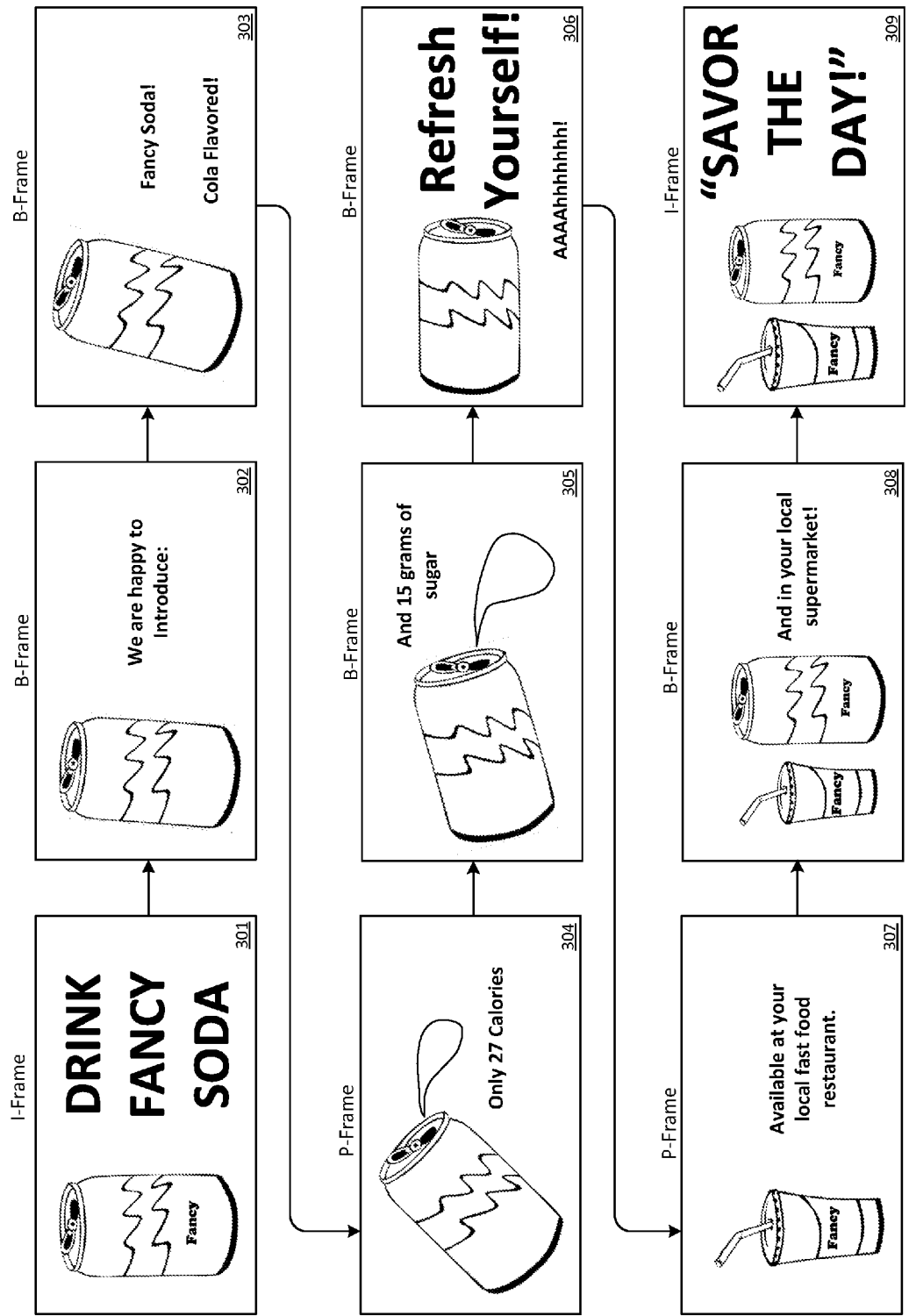
FIG. 3 illustrates an embodiment of multiple encoded frames.

FIG. 3 illustrates an exemplary embodiment of encoded frames produced by encoding engine 216. The frames of FIG. 3 may be processed by EME 200 of FIG. 2. In this example, an advertisement of a soda is being encoded. This example includes only nine frames; it should be understood that this is for simplicity only; in implementations it is common to have thirty or more frames per second; thus a thirty second commercial may have 900 frames. In the example of FIG. 3, encoding into an MPEG format, such as MPEG-4, is occurring.

Frame selection engine 214 may be used to select frames to be designated as I-frames. The frames to be designated as I-frames may be selected by frame selection engine 214 with or without user input and/or a frame preference being provided by the content provider based on the analysis performed by video feed analyzer 213. In the example in FIG. 3, frame 301 and frame 309 have been selected. Selection of these two frames may be based on reasons such as the advertiser's product and product name being prominently featured in frame 301 and the advertiser's slogan and product being prominently featured in frame 309. Other frames, while discussing opinions about the product, may be less essential to the advertiser's message, and thus are not selected.

While frame 301 and frame 309 are designated as I-frames under the MPEG encoding format, based on being selected by frame selection engine 214, other frames may be designated as other than I-frames, such as P-frames and B-frames. An I-frame may contain enough information to be constructed for output for presentation without reference to any other frame. In contrast, a P-frame requires reference to at least one other frame. A B-frame requires reference to at least two other frames, such as the immediately preceding and the immediately following frame. Therefore, while P- and B-frames may require the storage of less information, other frames are required to be referred to for the frames to be constructed for presentation.

Frame 302, frame 303, frame 305, frame 306, and frame 308 may be defined as B-frames, requiring that frame 301 be decoded along with other frames, such as frame 309. Frame 304 and frame 307 may be defined as changes based on frame 301, the I-frame, or some other frame, such as the immediately preceding frame. During playback (not in a trick mode), a viewer may be unaware of which frames are I-frames, P-frames, and B-frames. Rather, all frames may be presented as a stream of video, possibly with accompanying audio.

Encoding engine 216 may encode the frames into a format, such as an MPEG format, based on the designations noted in FIG. 3. Once encoded, the MPEG data may be scrambled and/or encrypted and broadcast to one or more television receivers.

Figure 4:
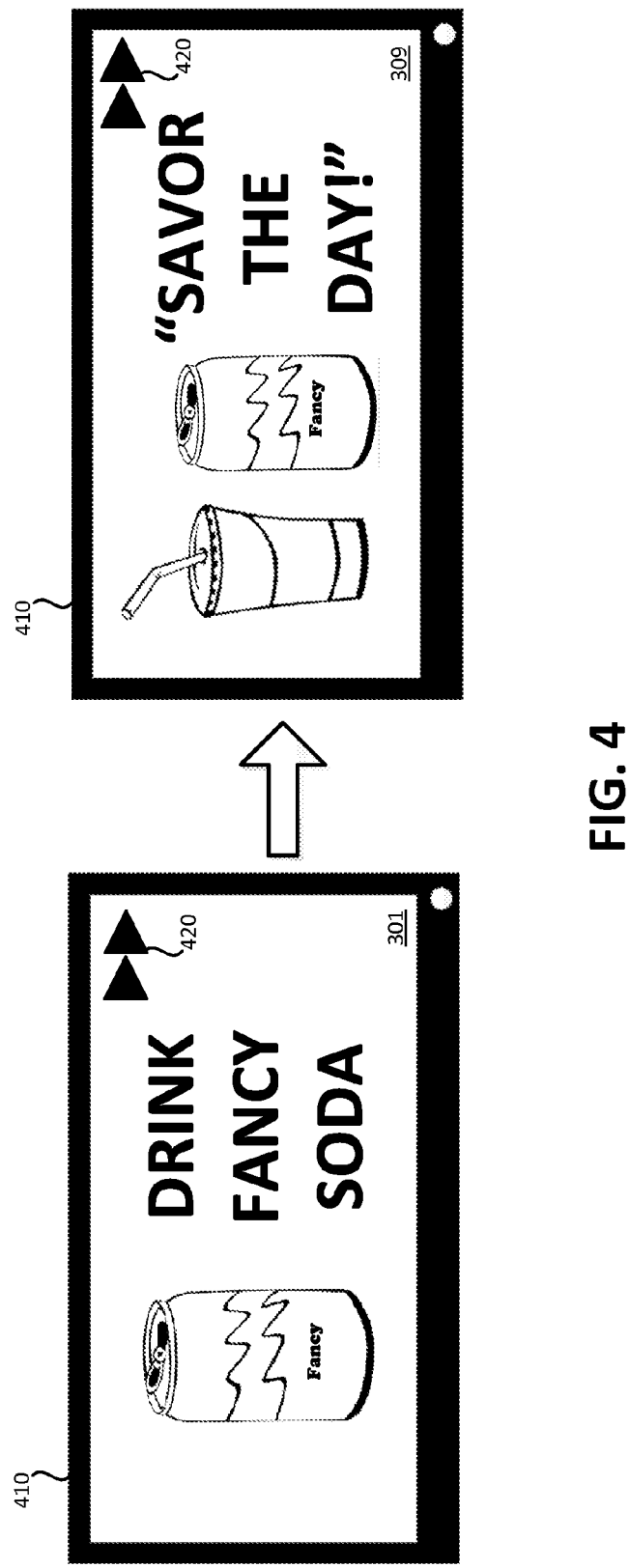
FIG. 4 illustrates an embodiment of playback of encoded frames in a trick play mode.

FIG. 4 illustrates an embodiment of playback of encoded frames in a trick play mode. The frames encoded in FIG. 3 by encoding engine 216 are received by a television receiver (or dedicated DVR) and stored. The frames are then decrypted (if necessary), descrambled (if necessary), and decoded for output for presentation by a television receiver to a display device 410 in FIG. 4. Display device 410 may represent display device 160 of FIG. 1. While during playback at normal speed all frames are output for presentation by the television receiver, during playback in a trick play mode, such as a fast forward trick play mode, fewer frames are output for presentation.

When fewer frames are output for presentation, it may be more likely that the frames that are output for presentation are frames that can be independently decoded from other frames. Therefore, when MPEG encoding is used, referring to FIG. 3, it may be more likely during a trick play mode used for playback that frame 301 and frame 309 will be output for presentation and less likely that frames 302-308 are output for presentation. In some embodiments, such as an embodiment where an activated trick play mode is intended to simulate a high fast forward speed, only frames 301 and 309 (from frames 301-309) may be presented.

Therefore, while a viewer is likely trying to skip through commercials by fast forwarding in a trick play mode, for the commercial being fast forwarded through, the user will at least see frame 301 and frame 309, which were selected during the encoding process as providing a representation of the advertiser via a slogan, name, logo, or other identifying characteristics. Therefore, of the frames present in the advertisement, the frames presented during playback in the trick play mode are likely the frames that best represent the advertiser and/or the message that the advertiser is attempting to get across. In FIG. 4, graphical indicator 420 indicates that a user has entered playback into a fast forward trick play mode. The frames output for presentation in the trick play mode include frame 301 and frame 309. These may be the only frames of the advertisement of FIG. 3 output for presentation or one or more additional frames may also be output. In some embodiments, only frames that are individually decodable (e.g., I-frames) are output for presentation while the trick play mode is active.

FIG. 4 shows fast forwarding in a trick play mode in which only I-frames are presented. It should be understood that at least some frames that are not I-frames may be presented; however, it may remain more likely that the frames presented in the trick play mode are I-frames (e.g., an increased percentage of frames output for presentation in the trick play mode are I-frames compared to during normal speed playback). While only a single advertisement is discussed in relation to FIGS. 2-4, it should be understood that such encoding, decoding, and presentation of selected frames may occur for multiple advertisements, such as multiple commercials appearing consecutively that were recorded as part of a commercial break in a television program. Further, such an arrangement may be used for television programs as well. For instance, frames which are key to the plot of a television program may be specifically designated as I-frames.

Figure 5:
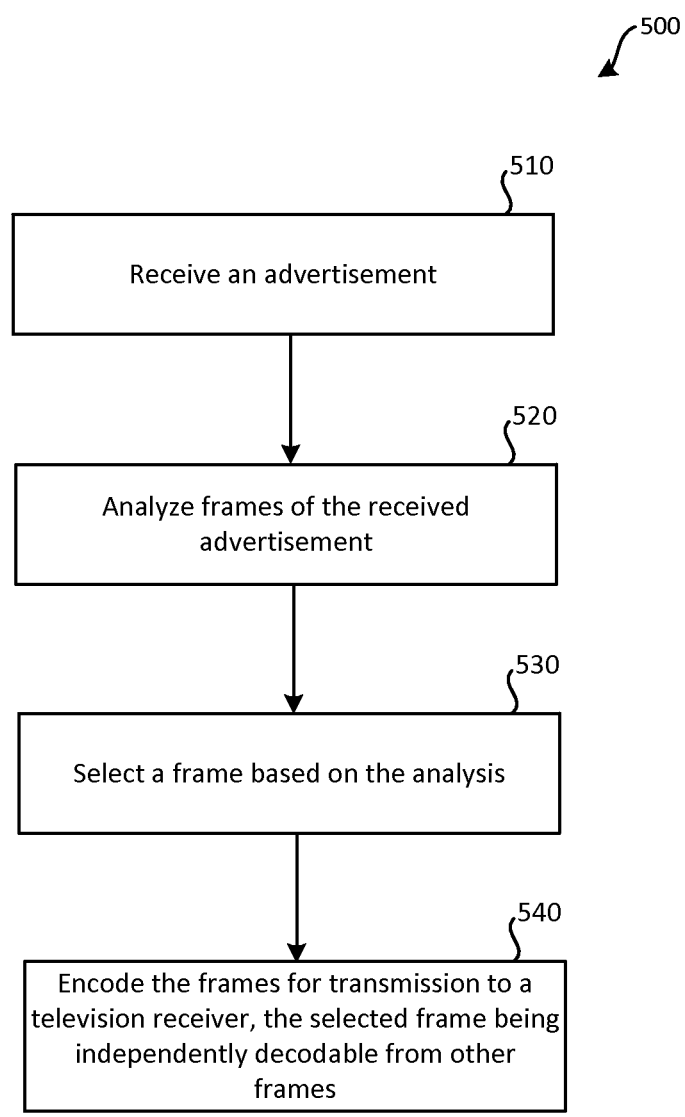
FIG. 5 illustrates an embodiment of a method for handling the broadcast of advertiser content.

Various methods may be involved in performing the encoding, broadcast, and playback discussed in relations to FIGS. 1-5. FIG. 5 illustrates an embodiment of a method 500 for handling the encoding of advertiser content. Such encoding of commercials may be performed such that frames of particular importance to an advertiser are independently decodable, such as I-frames in an MPEG encoding format. Method 500 may be performed by a television service provider system, such as television service provider system 110 of FIG. 1. More specifically, the steps of method 500 may be performed by EME 211 of FIG. 1, which is described in more detail in relation to FIG. 2. Accordingly, one or more computer systems, such as computer system 800 of FIG. 8 may be used to perform the steps of method 500. The following description of method 500 is focused on a single commercial that is to be broadcast and, likely, recorded by at least some television receivers (or DVRs). It should be understood that method 500 may be applied to multiple commercials and/or television programming.

At step 510, an advertisement (commercial) may be received by the system. The advertisement may be received individually, such as from an advertiser, or may be received from a content provider that is also distributing television programming. For instance, for a given block of time, such as 8:00 PM until 8:30 PM, the content provider may provide a block of content that includes a television program and one or more commercial breaks. The television program and the commercials may each consist of video and audio.

At step 520, frames of the received advertisement may be analyzed. Referring to FIG. 2, video feed analyzer 213 may perform step 520. At step 520, each frame (or at least some number of frames) of the received advertisement may be analyzed. Such analysis may be performed to identify frames in which one or more identifiers associated with the advertiser are present (e.g., such as a logo, name, promotion, slogan, etc.). Such analysis may be performed in conjunction with a database of information about the advertiser (which is represented by advertiser information module 215). Frames may be scored that include such information associated with the advertiser. The more prominent one or more identifiers of the advertiser are within a frame, the higher the score. Alternatively, the analysis of step 520 may be performed to identify one or more frames specified by the advertiser or content provider. For instance, when the advertisement was provided to the system, an indication of one or more frames desired to be presented during playback in a trick play mode may have been indicated.

At step 530, one or more frames may be selected based upon the analysis of step 520. The frames selected may best represent the advertiser from among the frames of the commercial analyzed at step 520. For instance, referring to FIG. 3, frames were selected that indicates the product's name, an image of the product, and the product's slogan. In some embodiments, an agent of the television service provider may view the frames analyzed in step 520 and may select one or more frames. Selection of the one or more frames at step 530 may be based on factors in addition to the frame serving as a representation of the advertiser (such as due to the presence of a logo, slogan, name, promotion, etc.). For instance, the number of frames since the previous I-frame (or other form of independently decodable frame), similarity to other frames, and other encoding characteristics may be taken into account.

At step 540, encoding of the advertisement may be performed. Such encoding may be into a format such as MPEG-4. The selected frames may be encoded such that these frames are independently decodable from other frames. Some or all of the unselected frames may be encoded such that they require one or more other frames, such as the selected frames, to also be decoded. In MPEG encoding, the selected frames may be encoded as I-frames, while unselected frames may be encoded as P-frames, B-frames, or as I-frames. Following step 540, a content stream that is encoded for broadcast may be present. This content stream may then be scrambled (and/or encrypted) and broadcast to multiple television receivers. If recorded by a television receiver or DVR, the content stream played back at normal speed may appear normal. However, if a trick play mode is used to fast forward through the commercial, it may be likely that the selected frames are output for presentation due to the selected frames being encoded as I-frames (independently decodable).

Figure 6:
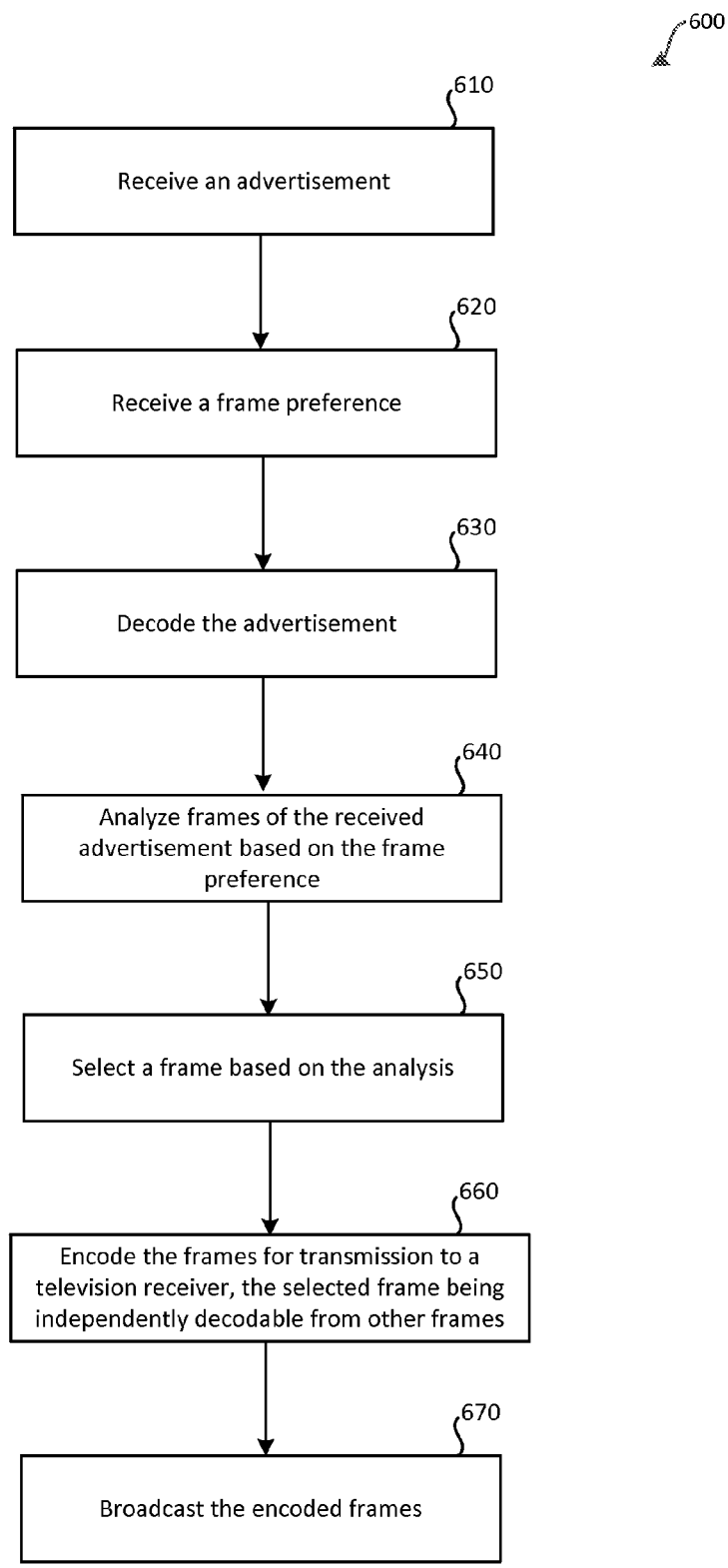
FIG. 6 illustrates another embodiment of a method for handling the broadcast of advertiser content.

FIG. 6 illustrates an embodiment of a method 600 for handling the encoding of advertiser content. Such encoding of commercials may be performed such that frames of particular importance to an advertiser are independently decodable, such as I-frames in an MPEG encoding format. Method 600 may be performed by a television service provider system, such as television service provider system 110 of FIG. 1. More specifically, the steps of method 600 may be performed by EME 211 of FIG. 1, which is described in more detail in relation to FIG. 2. Accordingly, one or more computer systems, such as computer system 800 of FIG. 8 may be used to perform the steps of method 600. The following description of method 600 is focused on a single commercial that is to be broadcast and, likely, recorded by at least some television receivers (or DVRs). It should be understood that method 600 may be applied to multiple commercials and/or television programming.

At step 610, a video-based advertisement (e.g., a television commercial) may be received by the system. Such an advertisement may be scheduled for future broadcast on a television channel. The advertisement may be received individually, such as from an advertiser, or may be received from a content provider that is also distributing television programming. For instance, for a given block of time, such as 8:00 PM until 8:30 PM, the content provider may provide a block of content that includes a television program and one or more commercial breaks. The television program and the commercials may each consist of video and audio. At step 620, the advertiser (or other content provider) may provide an indication of a frame preference. This may involve the advertiser providing a listing of one or more preferred frames, such as in a preferred order. Such a listing may be by frame number. In some embodiments, the frame preference may be identified by a characteristic, such as "a frame in which our logo appears" or "a frame that shows our company name." Based upon such a preference, a frame may be selected for the advertiser or other content provider.

At step 630, the advertisement may be decoded from a format that was used to transmit the advertisement to the system from the advertiser or other content provider. For example, if transmitted to the system in an MPEG format, the advertisement may be decoded from the MPEG format.

At step 640, frames of the received advertisement may be analyzed. Referring to FIG. 2, video feed analyzer 213 may perform step 640. At step 640, each frame (or at least some number of frames) of the received advertisement may be analyzed. Such analysis may be performed to identify frames in which one or more identifiers associated with the advertiser are present (e.g., such as a logo, name, promotion, slogan, location, etc.). Such analysis may be performed in conjunction with a database of information about the advertiser (which is represented by advertiser information module 215). If the advertiser indicated one or more specific frames that are preferred at step 620, these frames may be located at step 640. If the advertiser identified a desired characteristic, one or more frames with the desired characteristic may be located, such as by searching the frames of the received advertisement based on information from advertiser information module 215. During the analysis of step 640, frames may be scored that include information associated with the advertiser. Frames with the highest score may then be selected at step 650.

At step 650, one or more frames may be selected based upon the analysis of step 640. The frames selected may best represent the advertiser from among the frames of the commercial analyzed at step 640. The frames selected may also be from a list of frames provided by the advertiser as preferred. For instance, if an advertiser or other content provider provided a list of ten frames, at least some of these frames may be selected at step 650. Additionally or alternatively, frames may be selected at step 650 based upon the one or more characteristics noted by the advertiser as a frame preference. For instance, referring to FIG. 3, frames were selected that indicate the product's name, an image of the product, and the product's slogan. In some embodiments, an agent of the television service provider may view the frames analyzed in step 640 and may select one or more frames. Selection of the one or more frames at step 650 may be based on factors in addition to the frame serving as a representation of the advertiser (such as due to the presence of a logo, slogan, name, promotion, etc.). For instance, the number of frames since the previous I-frame (or other form of independently decodable frame), similarity to other frames, and other encoding characteristics may be taken into account. Bandwidth may be a concern and may at least partially dictate frames that should be used as I-frames or otherwise be encoded to be individually decodable.

At step 660, encoding of the advertisement may be performed. Such encoding may be into a format such as MPEG, MPEG-2, or MPEG-4. The selected frames may be encoded such that these frames are independently decodable from other frames. Some or all of the unselected frames may be encoded such that they require one or more other frames, such as the selected frames, to also be decoded. In MPEG encoding, the selected frames may be encoded as I-frames, while unselected frames may be encoded as P-frames, B-frames, and/or as I-frames. Following step 660, an encoded content stream that can be broadcast may be present. This encoded content stream may then be scrambled (and/or encrypted) and broadcast, at step 670, to multiple television receivers. If recorded by a television receiver or DVR, the content stream played back at normal playback speed may appear normal. Similarly, if the encoded content stream is viewed "live" (that is, without storing to a DVR database), playback may not appear to a viewer to be affected by specific frames being selected for encoding. However, if a trick play mode is used to fast forward or rewind through the commercial, it may be likely that the selected frames are output for presentation due to the selected frames being encoded as I-frames (frames that are independently decodable). At step 670, a continuous stream of content may be broadcast, such as television programming that is interspersed with television commercials.

Figure 7:
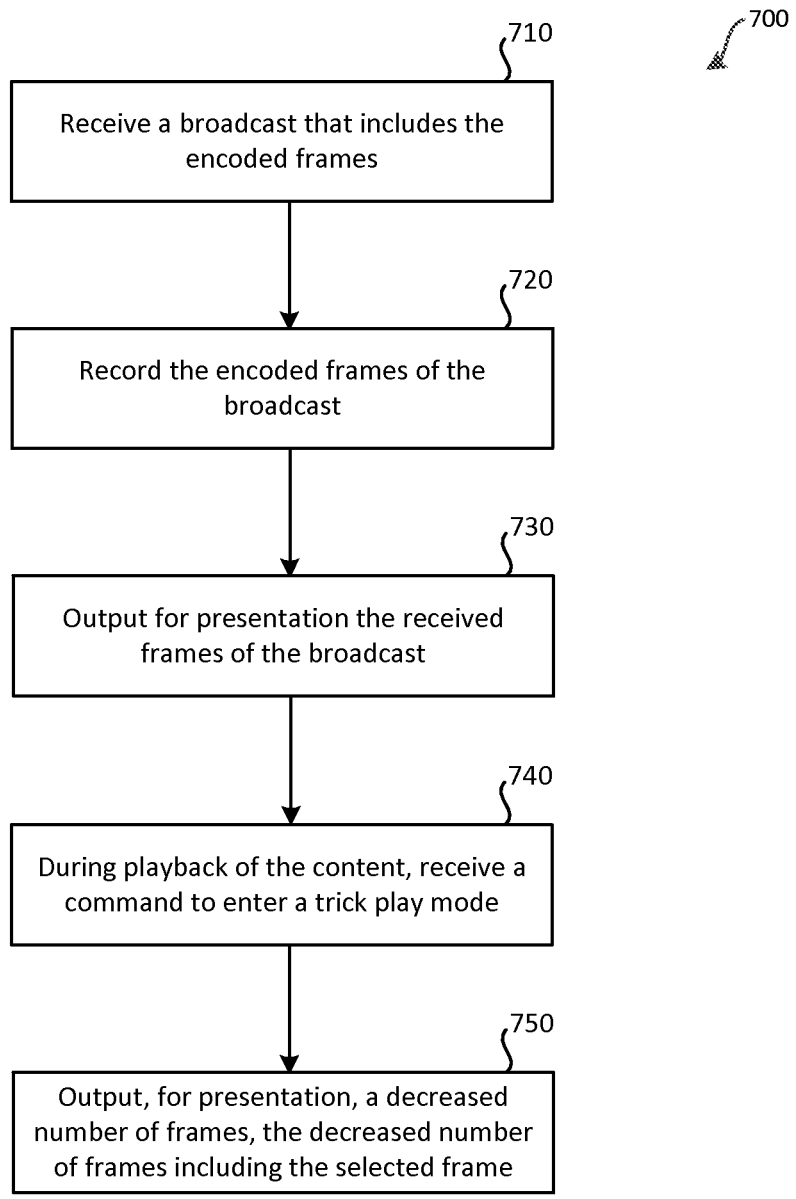
FIG. 7 illustrates an embodiment of a method for outputting for presentation advertiser content while in a trick play mode.

FIG. 7 illustrates an embodiment of a method 700 for outputting for presentation advertiser content while in a trick play mode. Method 700 may be performed by a television receiver following method 500 or method 600 being performed. Therefore, in method 700, a broadcast of the encoded advertisement has been made, be it by a satellite-based television distribution system, cable-based television distribution system, IP-based television distribution system, or over-the-air television distribution system. In method 700, a television receiver with DVR functionality, such as television receiver 150 of FIG. 1, may perform each step. Similarly, a dedicated DVR may be used to perform steps of method 700.

At step 710, the broadcast may be received that includes the encoded frames of the advertisement. If step 710 is performed by a television receiver, the television receiver may receive the broadcast from the service provider distribution network, such as illustrated in FIG. 1. If step 710 is performed by a DVR, it may receive the broadcast from a television receiver, which receives the broadcast from the service provider distribution network.

At step 720, the encoded frames of the received broadcast may be recorded. The recording may occur to a non-transitory computer-readable storage medium. (It should be understood, that the encoded broadcast may be directly decoded and output for presentation without recording; however, without recording, it would not be possible to enter a trick play mode.)

At step 730, during normal-speed playback, each frame received is output for presentation. Step 730 includes decoding from the format in which the broadcast was received, such as MPEG-4, to a format suitable for output to a display device. At step 730, descrambling and/or decryption of the received broadcast may also be performed. At step 730, frames which are independently decodable and frames which require other frames to also be decoded may all be decoded. From a viewer's point-of-view, it may not be possible to distinguish which frames are independently decodable and which frames require other frames to be decoded. If the broadcast is received in an MPEG format, all frames (I-frames, P-frames, and B-frames) may be decoded when playback is occurring at normal playback speed.

At step 740, while playback is occurring, while playback is stopped, or without playback having begun, user input may be received that initiates playback in a trick play mode. A trick play mode may be a fast forward trick play mode (which results in accelerated movement through the recorded content by skipping frames moving forward) or a rewind trick play mode (which results in accelerated movement through the recorded content by skipping frames moving backward). Trick play modes may simulate different speeds by skipping various numbers of frames. For the remainder of method 700, it is assumed that the viewer has entered a fast forward trick play mode, such as to skip through a commercial break appearing in the stored broadcast content.

At step 750, portions of the broadcast may be output for presentation while in the trick play mode. At least some frames may be skipped from output while in the fast forward mode. Some or all frames that require at least one other frame to be decoded (e.g., P-frames and B-frames in MPEG encoding) may be skipped from being decoded and from being output for presentation. At least some frames that can be independently decoded (e.g., I-frames in MPEG encoding) are decoded and output for presentation. Therefore, frames that are independently decodable are more likely to be output for presentation during a trick play mode. Accordingly, referring to methods 500 and 600, frames that were selected to be encoded to be independently decodable are more likely to be presented for output during playback in the trick play mode. At least some of the frames that are skipped may require that the selected frame that is independently decodable be decoded. Further, the "faster" the speed the trick play mode is intended to simulate, it may be more likely that the frames output for presentation are independently decodable frames.

While the above methods focus on a single commercial or advertisement, it should be understood that similar arrangements may be used for multiple commercials or advertisements. Further, similar methods may be applied to other forms of content, such as a television program or content recorded to portable media (e.g., a BLU-RAY® disc or DVD).

For method 700, in the case of an IP-based television distribution system, trick play modes may be handled by the head end (the television service provider). As such, only frames that correspond to I-frames may be received by the television receiver from the television service provider if the user has provided user input requesting a trick play mode.

Figure 8:
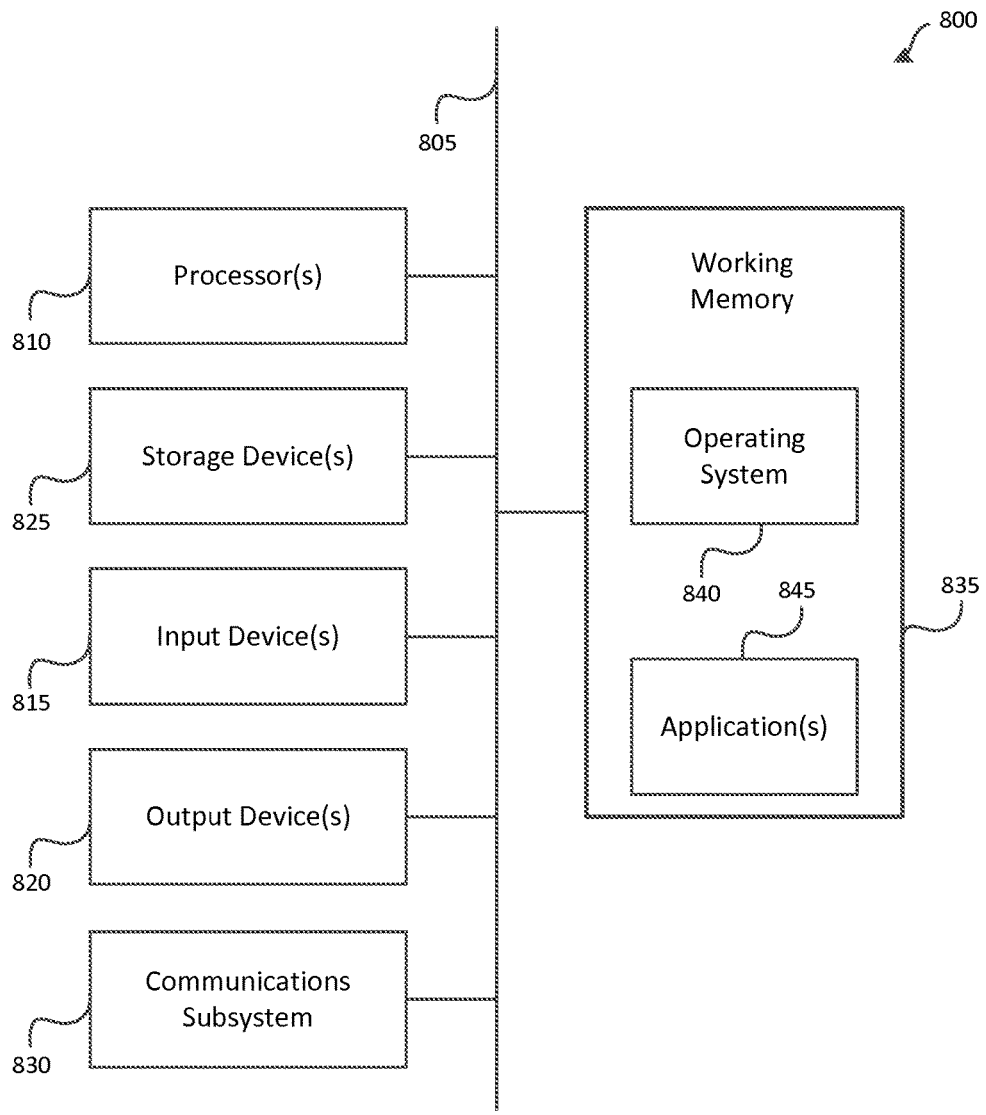
FIG. 8 illustrates an embodiment of a computer system.

FIG. 8 illustrates an embodiment of a computer system. A computer system as illustrated in FIG. 8 may be incorporated as part of the previously described computerized devices, such as the television receivers, television service provider systems, and, more specifically, the encoding management engines. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for handling broadcast of advertiser content, the method comprising:
   receiving, by a television service provider computer system, broadcast content from a content provider, wherein the broadcast content comprises a video-based advertisement and a television program;
   decoding, by the television service provider computer system, the broadcast content from the content provider;
   receiving, by the television service provider computer system, an ordered listing of a plurality of preferred frames from an advertiser associated with the video-based advertisement, wherein the ordered listing lists the preferred frames in an order preferred by the advertiser for presentation;
   selecting a frame of the plurality of frames based on the ordered listing provided by the advertiser;
   re-encoding the broadcast content into an MPEG format for transmission to a plurality of television receivers, such encoding comprising:
      encoding the frame selected from the plurality of frames as an I-frame such that the frame can be decoded independently of other frames of the plurality of frames, wherein:
         the other frames of the plurality of frames comprise P-frames, B-frames, or both; and
         for presentation, at least a subset of the P-frames and the B-frames of the plurality of frames require decoding of the selected frame encoded as the I-frame to be performed prior to decoding of any individual frame of the subset of frames; and
   broadcasting, by the television service provider system, the re-encoded broadcast content in the MPEG format for transmission to the plurality of television receivers via a television service provider distribution network.

2. The method for handling broadcast of advertiser content of claim 1, the method further comprising:
   receiving, by a television receiver, the encoded broadcast content;
   decoding, by the television receiver, the encoded broadcast content; and
   commencing output, by the television receiver, for presentation, the decoded broadcast content.

3. The method for handling broadcast of advertiser content of claim 2, the method further comprising:
   receiving, by the television receiver, user input specifying playback of the decoded broadcast content should be performed in a trick mode;
   switching, by the television receiver, output of the decoded broadcast content to the trick mode;
   while in the trick mode, output for presentation, by the television receiver, the selected frame; and
   while in the trick mode, skipping, by the television receiver, output for presentation of the subset of the plurality of frames.

4. The method for handling broadcast of advertiser content of claim 1, further comprising:
   outputting, by a television receiver, while in a trick play mode, only I-frames.

5. The method for handling broadcast of advertiser content of claim 1, wherein the advertiser-specific graphical identifier being present comprises a graphical indication selected from the group consisting of:
   a graphical logo of an advertiser; and
   text identifying the advertiser.

6. The method for handling broadcast of advertiser content of claim 1, wherein selecting the frame of the plurality of frames based on the advertiser-specific graphical identifier being present is based on an advertiser frame identification received from the content provider.

7. A system for handling broadcast of advertiser content, the system comprising:
   an encoding management engine comprising:
      one or more processors; and
      a memory communicatively coupled with and readable by the one or more processors and having stored therein processor-readable instructions which, when executed by the one or more processors, cause the one or more processors to:
         receive broadcast content from a content provider, wherein the broadcast content comprises a video-based advertisement and a television program;
         decode the broadcast content from the content provider;
         receive an ordered listing of a plurality of preferred frames from an advertiser associated with the video-based advertisement, wherein the ordered listing lists the preferred frames in an order preferred by the advertiser;
         select a frame of the plurality of frames based on the ordered listing provided by the advertiser; and re-encode the broadcast content into an MPEG format for transmission to a plurality of television receivers, such encoding comprising:
encoding the frame selected from the plurality of frames as an I-frame such that the frame can be decoded independently of other frames of the plurality of frames, wherein:
the other frames of the plurality of frames comprise P-frames, B-frames, or both; and
for presentation, at least a subset of the P-frames and the B-frames of the plurality of frames require decoding of the selected frame encoded as the I-frame to be performed prior to decoding of any individual frame of the subset of frames; and
cause the re-encoded broadcast content to be broadcast in the MPEG format to the plurality of television receivers via a television service provider distribution network.

8. The system for handling broadcast of advertiser content of claim 7, the system further comprising:
a television receiver, configured to:
receive the encoded broadcast content;
decode the encoded broadcast content; and
output, for presentation, the decoded broadcast content.

9. The system for handling broadcast of advertiser content of claim 8, wherein the television receiver is further configured to:
receive user input specifying playback of the decoded broadcast content should be performed in a trick mode;
switch output of the decoded broadcast content to the trick mode;
while in the trick mode, output for presentation the selected frame; and
while in the trick mode, skip output for presentation of the subset of the plurality of frames.

10. The system for handling broadcast of advertiser content of claim 7, wherein the advertiser-specific graphical identifier being present comprises a graphical indication selected from the group consisting of:
a graphical logo of the advertiser; and
text identifying the advertiser.

11. The system for handling broadcast of advertiser content of claim 7, wherein the processor-readable instructions that, when executed, cause the one or more processors to select the frame of the plurality of frames based on the advertiser-specific graphical identifier being present is based on an advertiser frame identification received from the content provider.

12. A non-transitory processor-readable medium for handling broadcast of advertiser content, comprising processor-readable instructions configured to cause one or more processors to
receive broadcast content from a content provider, wherein the broadcast content comprises a video-based advertisement;
decode the broadcast content from the content provider;
receive an ordered listing of a plurality of preferred frames, wherein the ordered listing lists the preferred frames in a preferred order;
select a frame of the plurality of frames based on the ordered listing;
re-encode the broadcast content into a format for transmission to a plurality of television receivers, such encoding comprising:
encoding the frame selected from the plurality of frames such that the frame can be decoded independently of other frames of the plurality of frames, wherein:
for presentation, at least a subset of frames from the plurality of frames requires decoding of the selected frame to be performed prior to decoding of any individual frame of the subset of frames; and
cause the re-encoded broadcast content to be broadcast in the format to the plurality of television receivers via a television service provider distribution network.

13. The non-transitory processor-readable medium for handling broadcast of advertiser content of claim 12, wherein the advertiser-specific graphical identifier being present comprises a graphical indication selected from the group consisting of:
a graphical logo of the advertiser; and
text identifying the advertiser.

14. The non-transitory processor-readable medium for handling broadcast of advertiser content of claim 12, wherein the processor-readable instructions configured to cause the one or more processors to select the frame of the plurality of frames based on the advertiser-specific graphical identifier being present is based on an advertiser frame identification received from the content provider.

15. The non-transitory processor-readable medium for handling broadcast of advertiser content of claim 12, wherein the broadcast content includes a television program.

\* \* \* \* \*